United States Patent
Morales Espejel et al.

(10) Patent No.: US 8,231,277 B2
(45) Date of Patent: Jul. 31, 2012

(54) SLIDING BEARING WITH DIFFERENT SETS OF CAVITIES

(75) Inventors: Guillermo Enrique Morales Espejel, Huizen (NL); Eric Robert, Tours (FR); Frederic Ponson, Luynes (FR)

(73) Assignee: AB SKF, Gothenburg (SE)

( * ) Notice: Subject to any disclaimer, the term of this patent is extended or adjusted under 35 U.S.C. 154(b) by 772 days.

(21) Appl. No.: 11/885,794

(22) PCT Filed: Mar. 9, 2006

(86) PCT No.: PCT/NL2006/050049
§ 371 (c)(1),
(2), (4) Date: May 21, 2008

(87) PCT Pub. No.: WO2006/096062
PCT Pub. Date: Sep. 14, 2006

(65) Prior Publication Data
US 2008/0273825 A1    Nov. 6, 2008

(30) Foreign Application Priority Data

Mar. 9, 2005 (EP) .................................. 05101827

(51) Int. Cl.
*F16C 33/66* (2006.01)
*F16C 33/20* (2006.01)
(52) U.S. Cl. ................... 384/293; 384/113; 384/291
(58) Field of Classification Search .......... 384/114–115, 384/118, 283–284, 291–294, 300, 113
See application file for complete search history.

(56) References Cited

U.S. PATENT DOCUMENTS

| | | | | |
|---|---|---|---|---|
| 1,637,317 A | * | 7/1927 | Shoemaker | 384/293 |
| 2,757,055 A | * | 7/1956 | Davis | 384/284 |
| 2,901,297 A | * | 8/1959 | Sternlicht | 384/291 |
| 4,105,267 A | * | 8/1978 | Mori | 384/291 |
| 4,491,373 A | | 1/1985 | Sugi et al. | |
| 5,129,739 A | * | 7/1992 | Asai et al. | 384/292 |
| 5,351,397 A | * | 10/1994 | Angeli | 29/890.053 |
| 5,415,476 A | * | 5/1995 | Onishi | 384/114 |
| 5,630,953 A | * | 5/1997 | Klink | 219/121.69 |
| 6,059,460 A | * | 5/2000 | Ono et al. | 384/283 |
| 6,095,690 A | | 8/2000 | Niegel et al. | |
| 7,320,549 B2 | * | 1/2008 | Kubota et al. | 384/283 |
| 2002/0148430 A1 | | 10/2002 | Kano et al. | |
| 2003/0021711 A1 | | 1/2003 | Klink et al. | |
| 2004/0228554 A1 | | 11/2004 | Fujita et al. | |

FOREIGN PATENT DOCUMENTS

| | | |
|---|---|---|
| EP | 0877866 B2 | 11/1998 |
| EP | 1231393 A1 | 8/2002 |
| SU | 1312274 A1 | 5/1987 |
| WO | 9728379 | 8/1997 |

* cited by examiner

*Primary Examiner* — Marcus Charles
(74) *Attorney, Agent, or Firm* — The Webb Law Firm

(57) ABSTRACT

A sliding bearing, such as a journal bearing, includes at least two bearing elements, the bearing surfaces of which are slidably supported with respect to each other. At least one of the surfaces is provided with a first type of cavity which may comprise a lubricating substance, the first type of cavity being defined by a specific range of geometric properties. At least one surface is provided with at least a second type of cavity which may comprise a lubricating surface, the second type of cavity being defined by geometric properties which are different from the geometric properties of the first type of cavity.

18 Claims, 2 Drawing Sheets

SLIDING BEARING WITH DIFFERENT SETS OF CAVITIES

BACKGROUND OF THE INVENTION

1. Field of the Invention

The invention is related to a sliding bearing, e.g., a journal bearing having comprising at least two bearing elements, the bearing surfaces of which are slidably supported with respect to each other, at least one of the bearing surfaces being provided with a first type of cavities which may comprise a lubricating substance, and with a second type of cavities which may comprise a lubricating substance.

2. Description of the Related Art

Such a journal bearing is disclosed in US-A-2004/0228554. This document is related to a plain bearing which has a sliding member provided with a plurality of holes which become gradually larger as they get closer to both ends in axial direction from the centre side of the sliding member. In particular, the sliding member may be formed by the main bearing which rotatably supports a crankshaft. The purpose of this particular pattern of holes is to improve the conformability of the sliding surface in an early state of sliding. The process of forming the sliding surface in question is made necessary by the fact that the load acts predominantly on both end portions of the main bearing, as a result of which the bearing surface load may arise to an extremely high level in those end portions. Thereby, the lubricating oil film may be destroyed, leading to partial metallic contact and seizure.

With the aim of the mitigating this adverse effect, the total area of the openings of the recesses per unit area is made to become gradually larger closer to the ends of the bearing. Thereby, the pressurized area in the end portions decreases. Consequently, in those end portions the strength of the sliding member is reduced, whereby the sliding surface wears in conformity with the deflection of the mating member. Accordingly, the sliding surface is worn at an early stage in the useful life of the bearing. As a result of this wear, the types of cavities become to resemble each other whereby a quasi uniform behaviour is obtained over the width of the bearing.

Such a layout with, in the end, more or less uniform cavities is not fit for providing adequate lubrication both under circumstances wherein low friction and full lubricant film conditions prevail, as well as under conditions wherein poor lubrication conditions prevail. It appears that the requirements of low friction under full lubricant film conditions and improved poor lubrication behaviour are at variance with each other. This is clear from the fact that for efficient operation under full lubricant film conditions, very shallow cavities are required. Such very shallow cavities will promote the pressure build up in the lubricant under running conditions. On the other hand, for an acceptable poor lubrication behaviour, sufficient amounts of lubricant should be available within the cavities. Typically, the latter requirement would result in relatively deep cavities. As both these circumstances may occur in the same bearing, a compromise has to be struck so as to ensure the proper operation of the bearing under all circumstances.

SUMMARY OF THE INVENTION

The object of the invention is therefore to provide the bearing of the type described before which is suitable for both full lubricant film conditions at low friction, and also for poor lubrication conditions. This object is achieved in that the different types of cavities are positioned in different areas of at least one surface, in that one type of cavities is designed for reducing friction between the sliding surfaces and carrying the full bearing design load under full lubrication film conditions, and in that one type of cavities is designed for providing lubrication under poor-lubrication conditions.

According to the invention, the contrasting demands of providing both full film conditions at low friction, and poor lubrication conditions, are reconciled with each other by providing two different types of surfaces which each comprise a specific type of cavities for a specific purpose. Consequently, the different types of cavities are not intermingled, and thus cannot influence their effects in a negative manner. According to the invention, different areas of the sliding contact are now assigned to different tasks, that is the provision of full lubricant film, low friction support and also poor lubrication condition support.

In particular, the different areas which each comprise a different type of cavities can be separated from each other by respective boundaries which are parallel to the sliding direction. Thus, under running conditions the cavities in the different areas are less prone to influence each other's behaviour. This means that the low friction full lubricant film is not destroyed by the relatively deep cavities in the other areas. The separation between the two different areas may be carried out in different ways, and for instance may take the form of a circumferential groove which clearly forms a barrier between these surfaces.

Preferably, one of the bearing elements, e.g. a journal pin, is stationary or quasi-stationary, the cavities being provided in the bearing surface of the (quasi-) stationary bearing element and the other bearing element(s) having a smooth bearing surface. With the aim of ensuring a proper release of the lubricant from the cavities into the bearing contacts under poor lubrication conditions, the transition area of the cavities and the undisturbed bearing surface is rounded at least at the side facing in the sliding direction of the other bearing element(s).

As already addressed, one type of cavities is designed for reducing friction between the sliding surfaces and carrying the full bearing design load under full lubrication film conditions. Preferably, these friction reducing cavities have a ratio between the depth of the cavity $h_p$ and the diameter $d_p$ of an equivalent circle which has the same area as the surface area of the cavity of 0.03-0.15. Furthermore, the cavity area ratio $S_p$ of these friction reducing cavities is then between 0.2-0.7. The number of friction reducing cavities in the sliding direction may range between 1 and 20.

The other type of cavities is designed for providing lubrication under poor-lubrication conditions. Preferably, this type of cavities designed for providing lubrication under poor-lubrication conditions have a ratio between the depth of the cavity hp and the diameter dp of an equivalent circle which has the same area as the surface area of the cavity of 0.5-5.0. The cavity area ratio $S_p$ of these cavities designed for providing lubrication under poor-lubrication conditions may range between 0.1-0.7.

The configuration of the bearing surface with the different types of cavities may be selected as desired. As a preferred example, reference is made to an embodiment wherein the area comprising cavities designed for reducing friction is positioned between opposite areas comprising cavities designed for providing lubrication under poor lubrication conditions. These areas may be separated from each other by respective relief grooves, which have the property of providing oil under poor lubrication circumstances such as during start up or during stop down of the bearing.

DETAILED DESCRIPTION OF THE PREFERRED EMBODIMENTS

Figure 1:
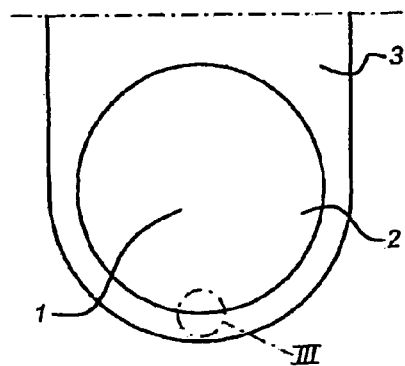
FIG. 1 is a side view of a journal bearing application.

FIG. 1 shows an example of a journal bearing arrangement, comprising a journal pin 1, a journal ring 2 and the end of a rod 3. It is pointed out that journal bearings can be contained in many other constructions as well, which are known to the skilled man and are not further addressed.

Figure 2:
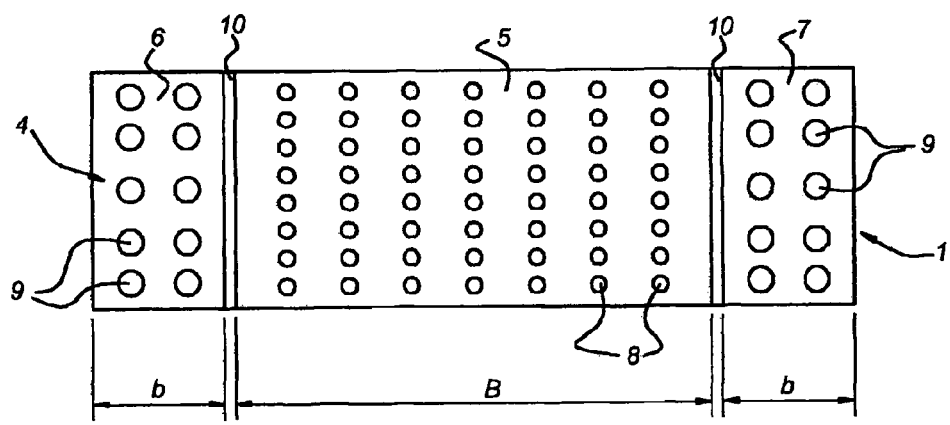
FIG. 2 is a view on the journal bearing pin according to the invention.

In FIG. 2, the journal pin 1 is shown. The journal pin has an outer surface 4, comprising a central area 5 bordered by two end areas 7. The central area 5 comprises relatively shallow cavities 8, whereas the end areas 6, 7 comprise relatively deep cavities 9. The areas 5, 6 and 7 are separated from each other by relief grooves 10.

According to the invention, the central area 5 comprises cavities which are designed for reducing friction between the journal pin 1 and the ring 2 under full lubrication conditions. That is, the cavities are advantageous when the normal amount of lubricant is available in the journal bearing contact.

However, it is conceivable that the journal bearing contacts, that is the contact between the journal pin 1 and the journal ring 2, are not always fully filled with oil. This may for instance be the case during start-up of the bearing movement. Of course, also lack of a sufficient amount of lubricant may give rise to poor lubrication conditions even starved lubrication conditions.

Under these circumstances, the journal bearing is prone to the failure. The relatively shallow cavities 5 do not contain sufficient oil for ensuring some lubrication under these circumstances. As a result, heat is generated in the journal bearing contact resulting in a reduced life due to the risk of metal to metal contact.

According to the invention, the end areas 6, 7 are provided with relatively deep cavities 9. Such relatively deep cavities constitute good oil reservoirs. Thus, they are able to supply lubricant to the journal bearing contact in the case of poor or even starved lubrication conditions. Under these circumstances, the central area 5 is released from large force transfers, which means that the bearing is subjected to no or less wear. Also, the relief grooves may provide lubricant under such poor or starved lubrication conditions.

Having regard to the fact that the relief grooves 10, which constitute the boundaries between the areas 5, 6 and 7 are oriented in the running direction, the relatively deep cavities 9 do not influence the lubrication behaviour of the relatively shallow cavities 8 in the central area 5. Thus, as soon as sufficient oil is available, or the starting up phase has passed, the central area 5 with its relatively shallow cavities 8 is able to resume its normal full lubrication film behaviour with low friction properties.

Figure 3:
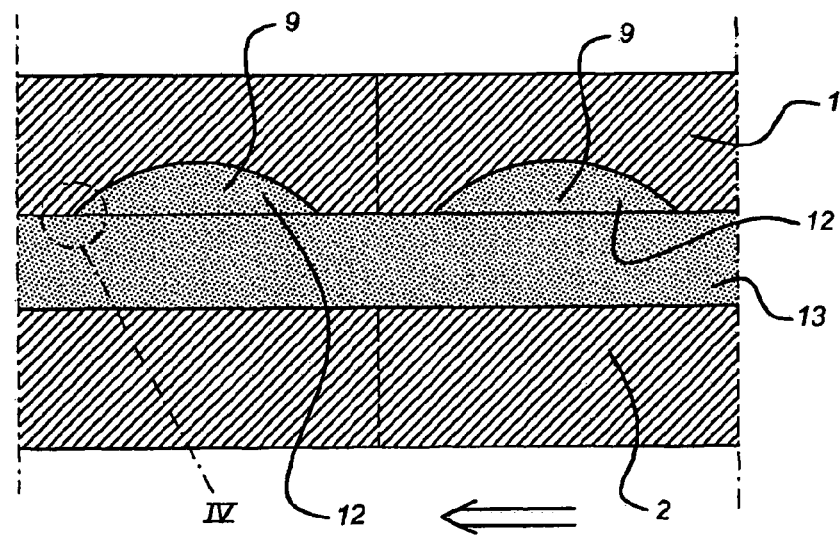
FIG. 3 is a detail view of the journal bearing according to III of FIG. 1.

FIG. 3 shows a cross section through the journal pin 1 and the journal ring 2, perpendicular with respect to the axis of the journal bearing. In particular, the cross section positioned at the relatively deep cavities 9 in the end areas 6, 7. The cavities are filled with amounts of lubricant 12, and also a lubricant film 13 is present between the bearing elements 1, 2. The relative movement of the element 2 has been indicated by the double arrows.

Figure 4:
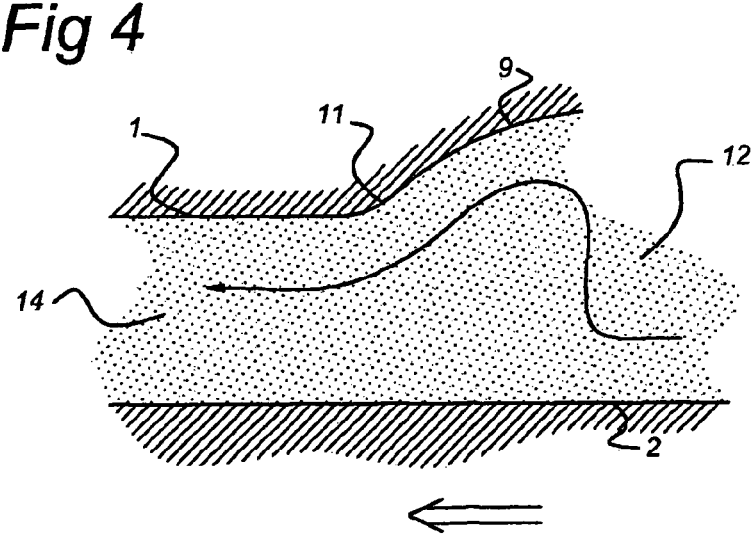
FIG. 4 is an enlarged detail view according to IV of FIG. 3.

The bearing pin 1 is stationary and the ring 2 is sliding in the direction as shown in FIG. 3. With the aim of enabling the transfer of amounts of oil 12 in the cavities 9 into the bearing contact 14, the transition area 11 between the cavities 9 and the undisturbed surface of the journal pin 1 is rounded. Thereby the flow of the oil as indicated by the curved arrow in FIG. 4 is obtained.

Although in the figures a journal bearing is shown, the invention can be applied to other sliding bearings or plain bearings as well. Examples include any surfaces which are slidable with respect to each other, such as reciprocating surfaces (piston/cylinder).

The invention claimed is:

1. A sliding bearing comprising at least two bearing elements, the bearing surfaces of which are slidably supported with respect to each other, at least one of said surfaces being provided with at least a first set of cavities and at least a second set of cavities, wherein the first set and the second set of cavities are positioned in different areas of said at least one surface, wherein the first set of cavities is designed for reducing friction between the sliding surfaces and carrying the full bearing design load under full lubrication film conditions, wherein the second set of cavities is designed for providing lubrication under less than full lubrication film conditions, wherein the different areas which each comprise the first set and the second set of cavities are separated from each other by respective circumferential grooves parallel to the sliding direction.

2. The bearing according to claim 1, wherein one of the bearing elements is stationary or quasi-stationary, the cavities being provided in the bearing surface of the bearing element and the other bearing element(s) having a smooth bearing surface.

3. The bearing according to claim 1, wherein transitions between the cavities and an undisturbed bearing surface are rounded at least at the side facing in the sliding direction of the other bearing element(s).

4. The bearing according to claim 1, herein friction reducing cavities have a ratio between the depth of the cavity ($h_p$) and the diameter ($d_p$) of an equivalent circle which has the same area as the surface area of the cavity in the range of 0.03-0.15.

5. The bearing according to claim 4, wherein the cavity ($S_p$) of the friction reducing cavities is in the range of 0.2-0.7.

6. The bearing according to claim 1, wherein the number of friction reducing cavities in the sliding direction is in the range of 1-20.

7. The bearing according to claim 1, wherein the second set of cavities have a ratio between the depth of the cavity ($h_p$) and the diameter ($d_p$) of an equivalent circle which has the same area as the surface area of the cavity in the range of 0.5-5.0.

8. The bearing according to claim 1, wherein the cavity area ratio ($S_p$) of the second set of cavities is in the range of 0.1-0.7.

9. The bearing according to claim 1, wherein the area comprising cavities designed for reducing friction is positioned between opposite areas comprising cavities designed for providing lubrication under less than full lubrication film conditions.

10. The bearing according to claim 1, wherein the areas with the first set of cavities and the second set of cavities are separated from each other by relief grooves.

11. The bearing according to claim 1, wherein the sliding bearing is a journal bearing.

12. The bearing according to claim 1, wherein the first set of cavities includes a lubricating substance.

13. The bearing according to claim 1, wherein the second set of cavities includes a lubricating substance.

14. The bearing according to claim 2, wherein the bearing elements are journal pins.

15. The bearing according to claim 1, wherein the different areas which each comprise the first set of cavities and the second set of cavities are separated from each other by grooves.

16. The bearing according to claim 1, wherein one of the bearing elements is stationary or quasi-stationary, the cavities being provided in the bearing surface of the bearing element and the other bearing element(s) having a smooth bearing surface.

17. The bearing according to claim 1, wherein one of the bearing elements is stationary or quasi-stationary, the cavities being provided in the bearing surface of the bearing element and the other bearing element(s) having a smooth bearing surface.

18. The bearing according to claim 1, wherein transitions between the cavities and an undisturbed bearing surface are rounded at least at the side facing in the sliding direction of the other bearing element(s).

* * * * *